UNITED STATES PATENT OFFICE.

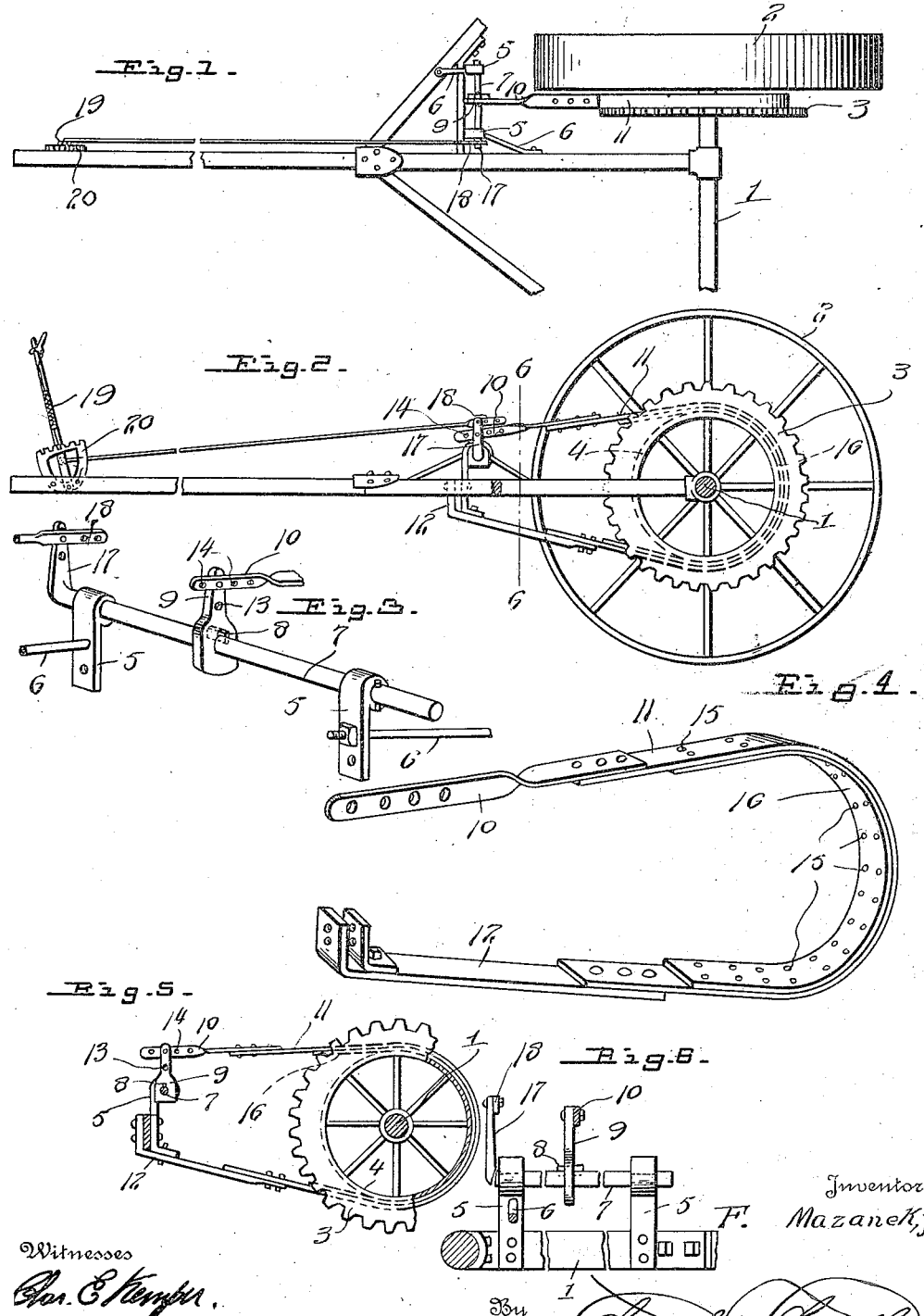

FRANK MAZANEK, JR., OF JENNINGS, KANSAS, ASSIGNOR OF ONE-HALF TO CEDELIE VACURA, OF JENNINGS, KANSAS.

BRAKE FOR HEADER HARVESTING-MACHINES.

1,178,590.  Specification of Letters Patent.  Patented Apr. 11, 1916.

Application filed December 23, 1914. Serial No. 878,661.

*To all whom it may concern:*

Be it known that I, FRANK MAZANEK, Jr., a citizen of the United States, residing at Jennings, in the county of Decatur, State of Kansas, have invented certain new and useful Improvements in Brakes for Header Harvesting-Machines; and I do hereby declare the following to be a full, clear, and exact description of the invention, such as will enable others skilled in the art to which it appertains to make and use the same.

This invention relates to a brake for header harvesting machines.

An object of the invention resides in the construction of a device of this character which may be attached to the harvesting machines of the types now used.

It is well known that when a harvesting machine of the ordinary type is used that very often when it is being moved either up or down hill the double-tree will break and thus the header will ride back upon the horses, or break away and consequently great damage is caused. By the provision of my device this objectionable feature has been done away for the operator may control the movement of the head either when the machine is going up or down hill.

I have so constructed the machine that the brake may be applied to either retard the rotation of the drive wheels or to completely prevent the rotation of the same, and I have made provision in the device whereby the necessity of moving the controlling lever to any great extent to apply the brake will be obviated.

I have still further constructed the device that the surface of engagement between the brake band and the brake drum may be varied at will.

With these and other objects in view, such as will appear as the description progresses, my invention comprises the combination and arrangement of parts as set forth in and falling within the scope of the appended claims.

Referring to the drawing: Figure 1 is a plan view of a portion of a header showing my device attached thereto. Fig. 2 is a side elevation of my device showing the same attached to a portion of a header. Fig. 3 is a fragmental perspective of the crank shaft. Fig. 4 is a similar view of the band brake and the means for connecting the same to the crank shaft and the frame of the header. Fig. 5 is a fragmental view, showing the band brake adjusted so as to engage a lesser portion of the periphery of the brake drum than that shown in Fig. 2. Fig. 6 is a section on line 6—6 of Fig. 2.

Referring to the drawing wherein like parts are indicated by like characters throughout the several views, the main frame of the header is indicated by the reference character 1 on which frame the usual drive wheels 2 are mounted. The said wheels have drive sprockets 3 secured to the spokes thereof. In order that the rotation of these drive wheels 2 may be retarded or completely prevented, I have provided the drive sprocket 3 on one of the wheels 2 with an outwardly extending concentric flange 4 which I term the brake drum for the sake of convenience.

Mounted on the frame 1 of the machine in spaced relation to the drive wheels 2 and to each other are upwardly extending bearing members 5 which are braced by forwardly and rearwardly extending rods 6, said rods being adjustably secured to the bearing members and permanently secured to the frame 1. Rotatably mounted in these bearings and extending transversely of the frame 1 is a shaft 7 on which is secured, by means of a pin 8, a crank arm 9 which normally extends upwardly. Secured to the said crank arm 9 is a connecting member 10 which is at its other end secured to a resilient steel band brake 11, which partly encircles the drum 4 and is attached at its other end, by means of a connecting member 12, to the frame 1 of the header. I have connected the member 10 to the crank arm 9 adjustably so that it may be either adjusted vertically on the said crank arm by the use of the holes 13 or may be adjusted transversely thereof by the use of the holes 14, the former being in the crank arm and varying the surface of the band brake which engages the drum and the latter being in the member 10 for varying the friction between the said band brake and drum. On the inner face of the band brake is secured, by means of rivets 15 a canvas strip 16 which bears against the drum 4 so that a more effective gripping action may be obtained. In order that this band brake 11 may be operated to grip the drum 4, I have provided on the end of the shaft 7 an upwardly extending integral arm 17 at one end thereof to which is pivotally connected a controlling link 18, the said arm 17 and controlling link 18 having a plurality of holes therethrough so that the link may be adjusted transversely or longitudinally of the arm, the former being to vary the motion of the controlling lever to be described and the latter to vary the length of the lever arm and consequently control the force which must be applied to the controlling lever to operate the band brake. This link 18 is connected to a suitable controlling lever 19 which is pivoted to and coöperates with a quadrant rack 20, the latter being secured to the main beam of the header within convenient reach of the operator.

In operation when it is desired to control the movement of the header when the same is going either up or down hill for the reason previously stated, the controlling lever 19 is operated so that the band brake 11 is applied to the drum 4. Now should it be desired to increase the surface of engagement between the band brake 11 and the drum 4 so that the brake may be more effectively applied, the connecting member 10 is adjusted vertically downwardly on the crank arm 9. It will be readily appreciated that this is sometimes necessary because of the fact that the band brake 11 wears during continual use and it is not desirable to obtain this adjustment by allowing the controlling arm to rest adjacent the end of the quadrant for when the brake wears more and more so will the lever have to be moved farther rearwardly until finally there will be no room to operate the same to apply the brake, therefore the construction which I have devised, allows the controlling lever to be maintained in a vertical position when the brake is inoperative. Furthermore it is often desirable to change the leverage on the crank shaft and I have provided holes in the arm 17 whereby the connecting link 18 may be adjusted either upwardly or downwardly and consequently the length of the lever arm changed.

From the foregoing description it will be seen that I have provided a band brake which is specially constructed for use on header harvesting machines, and I have so constructed the device that the surface of engagement between the band brake and drum may be varied as the occasion arises, and I have also constructed the device so that the frictional engagement between the said brake and drum may be varied without varying the amount of movement of the controlling lever.

While I have illustrated and described a particular embodiment of my invention, I have merely done so for the sake of convenience and I do not wish to be limited to that particular embodiment as it is obvious that numerous changes may be made in the details of construction thereof without departing from the spirit of the invention or exceeding the scope of the appended claims.

What I claim is:—

1. In combination with a brake drum, of a shaft mounted for oscillation adjacent said drum, a crank arm on the shaft, said arm being provided with a longitudinally disposed series of spaced openings, a brake band having one end fixed adjacent said shaft and passing over said drum, a strap member secured to the free end of said band, said member being provided with a longitudinally disposed series of spaced openings adapted for registration with those of said arm, a second crank arm on said shaft having a longitudinally disposed series of spaced openings, a link having a series of spaced apertures adapted for registration with those of said second crank arm, and means for detachably securing said link and member to said arms respectively.

2. In combination a drum, a shaft mounted adjacent said drum, a crank arm, having a vertical series of holes, secured to the said shaft, a connecting member pivotally secured to said crank arm and having a plurality of spaced apertures therein, the said member being adjustable transversely and longitudinally of the said crank arm, a band brake secured to said member, partly encircling the said drum and permanently secured at its other end adjacent said shaft, and means for rotating the said shaft.

In testimony whereof, I affix my signature, in the presence of two witnesses.

FRANK MAZANEK, JR.

Witnesses:
B. W. WERNETTE,
J. F. LEONARD.